(12) United States Patent
Freeman Lea et al.

(10) Patent No.: US 11,564,499 B2
(45) Date of Patent: Jan. 31, 2023

(54) SEAT ADJUSTER

(71) Applicant: Lear Corporation, Southfield, MI (US)

(72) Inventors: Adam Freeman Lea, Coventry (GB); Darren Legh, Wolverhampton (GB); David Jordan, Stratford Upon Avon (GB); Pete Ford, Leicester (GB); Chris Morrison, Swindon (GB); Antony Baxter, Southam (GB); Chris J. Edwards, Burton on Trent (GB)

(73) Assignee: Lear Corporation, Southfield, MI (US)

( * ) Notice: Subject to any disclaimer, the term of this patent is extended or adjusted under 35 U.S.C. 154(b) by 162 days.

(21) Appl. No.: 16/933,300

(22) Filed: Jul. 20, 2020

(65) Prior Publication Data

US 2022/0015545 A1 Jan. 20, 2022

(51) Int. Cl.
*A47C 7/14* (2006.01)
*A47C 27/08* (2006.01)
*A47C 27/10* (2006.01)

(52) U.S. Cl.
CPC ............ *A47C 7/142* (2018.08); *A47C 27/081* (2013.01); *A47C 27/085* (2013.01); *A47C 27/10* (2013.01)

(58) Field of Classification Search
None
See application file for complete search history.

(56) References Cited

U.S. PATENT DOCUMENTS

| | | | | |
|---|---|---|---|---|
| 5,076,643 A | * | 12/1991 | Colasanti | A47C 7/467 297/284.6 |
| 5,082,326 A | * | 1/1992 | Sekido | B60N 2/885 297/284.6 |
| 5,772,281 A | * | 6/1998 | Massara | B60N 2/914 297/284.6 |
| 6,370,716 B1 | * | 4/2002 | Wilkinson | A61G 7/05776 297/452.41 |
| 6,986,182 B2 | * | 1/2006 | Mossbeck | A47C 27/061 267/95 |
| 8,011,729 B2 | * | 9/2011 | Petzel | B60N 2/667 297/284.6 |
| 8,226,166 B2 | * | 7/2012 | Petzel | B60N 2/56 297/284.6 |
| 9,114,743 B2 | | 8/2015 | Komamura et al. | |
| 9,211,824 B2 | | 12/2015 | Arant et al. | |
| 9,802,521 B2 | | 10/2017 | Ferretti et al. | |

(Continued)

FOREIGN PATENT DOCUMENTS

JP 57194119 A * 11/1982
JP 57194120 A * 11/1982

(Continued)

*Primary Examiner* — David E Allred
(74) *Attorney, Agent, or Firm* — Fishman Stewart PLLC (57) ABSTRACT

A seat adjuster may include a support member and a fluid bladder. The support member may have a first end and a second end. The first end and the second end may be connectable to a seat frame such that the support member is disposed at least partially below a suspension portion of said seat frame. The fluid bladder may be disposed at least partially between the support member and said suspension portion. The fluid bladder may be configured to support said suspension portion. A change or adjustment of a volume of the fluid bladder may change or adjust the support provided to said suspension portion.

20 Claims, 11 Drawing Sheets

(56) References Cited

U.S. PATENT DOCUMENTS

| | | | |
|---|---|---|---|
| 9,937,826 B2 | 4/2018 | Dry | |
| 2003/0028971 A1* | 2/2003 | Chaffee | A47C 15/006 5/710 |
| 2005/0273939 A1* | 12/2005 | Mossbeck | A47C 27/061 5/716 |
| 2007/0164531 A1* | 7/2007 | Bryant | B60G 3/06 280/124.179 |
| 2009/0108654 A1* | 4/2009 | Petzel | B60N 2/986 297/284.1 |
| 2009/0250991 A1* | 10/2009 | Mossbeck | A47C 4/54 297/452.52 |
| 2011/0285189 A1* | 11/2011 | Petzel | B60N 2/667 297/284.1 |
| 2013/0285426 A1* | 10/2013 | Arant | B60N 2/7082 297/452.48 |
| 2014/0007761 A1* | 1/2014 | Haidar | B60N 2/24 89/36.01 |
| 2014/0041127 A1* | 2/2014 | Codos | A47C 27/10 5/713 |
| 2017/0000685 A1* | 1/2017 | Rohr | A47C 21/006 |
| 2017/0036725 A1* | 2/2017 | Campfield | B62J 1/12 |
| 2018/0178694 A1* | 6/2018 | McMillen | B60N 2/7017 |
| 2018/0281621 A1* | 10/2018 | Kaku | A61B 5/6893 |
| 2019/0039480 A1 | 2/2019 | Hunt | |

FOREIGN PATENT DOCUMENTS

| | | | | |
|---|---|---|---|---|
| JP | 61036029 A | * | 2/1986 | |
| WO | WO-2011156891 A1 | * | 12/2011 | A47C 21/048 |

* cited by examiner

SEAT ADJUSTER

TECHNICAL FIELD

The present disclosure generally relates to a seat adjuster for seat assemblies, including seat assemblies in vehicles, and a seat assembly with a seat adjuster.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some seat adjusters may be relatively complex, may include several different portions which may be difficult to assemble and operate, and/or may not provide sufficient support to adequately and/or comfortably support a user of a seat assembly.

There is a desire for solutions/options that minimize or eliminate one or more challenges or shortcomings of seat adjusters. The foregoing discussion is intended only to illustrate examples of the present field and is not a disavowal of scope.

SUMMARY

In embodiments, a seat adjuster may include a support member and a fluid bladder. The support member may have a first end and a second end. The first end and the second end may be connectable to a seat frame such that the support member is disposed at least partially below a suspension portion of said seat frame. The fluid bladder may be disposed at least partially between the support member and said suspension portion. The fluid bladder may be configured to support said suspension portion. A change or adjustment of a volume of the fluid bladder may change or adjust the support provided to said suspension portion.

In embodiments, a method of operating the seat assembly may include applying a force to a suspension portion, inflating one or more bladders to one of a plurality of inflation levels corresponding to a plurality of levels of support, and/or limiting deformation of the suspension portion via the bladder and the support member.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1:
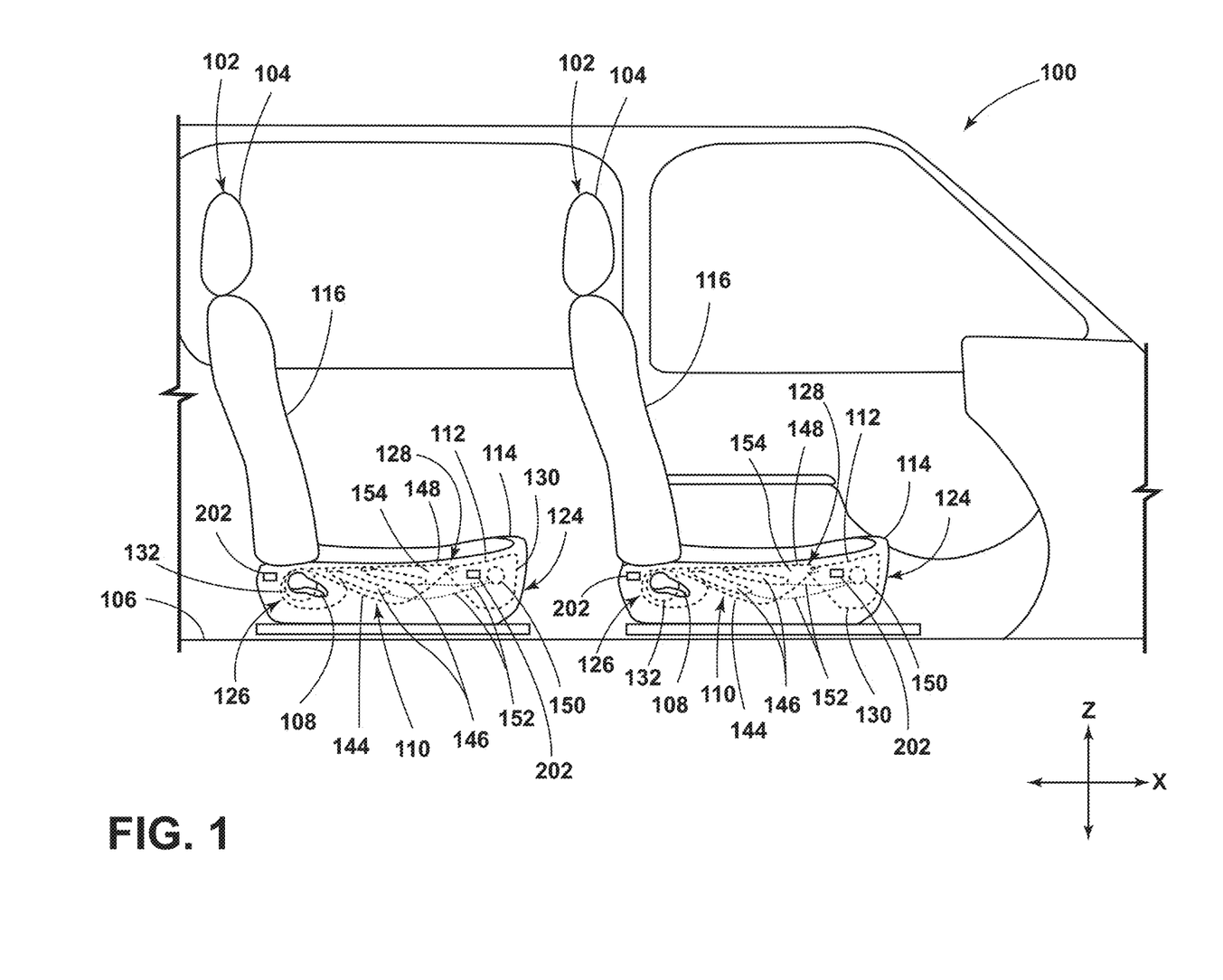
FIG. 1 is a side view generally illustrating a vehicle including an embodiment of a seat assembly having a seat adjuster according to teachings of the present disclosure.

In embodiments, such as illustrated in FIG. 1, a seat assembly 102 may be configured as a modular seat assembly that may include a plurality of components which, when assembled, may form a vehicle seat 104, such as for a passenger vehicle 100 (e.g., cars, vans, SUVs, trucks, buses, trains, boats, ships, planes, etc.). The seat assembly 102 may be utilized in any other appropriate situation or apparatus, such as homes, office buildings, theaters, stadiums, recreational vehicles, commercial vehicles, and/or agricultural equipment, among others. The seat assembly 102 may be disposed within and/or connected to a vehicle 100, such as to the floor 106 of the vehicle 100. The seat assembly 102 may include a seat 104, an adjustment mechanism 108, and/or a seat adjuster 110.

With embodiments, such as generally illustrated in FIG. 1, a seat 104 may include a seat frame 112, a seat bottom 114, and/or a seatback 116. The seat bottom 114 and/or the seatback 116 may be connected to and/or supported by the seat frame 112. The seat frame 112, the seat bottom 114, and/or the seatback 116 may be configured to move (e.g., adjust, recline, rotate, fold, collapse, etc.) via actuation of the seat adjuster 110. In some embodiments, the seat bottom 114 and/or the seatback 116 may include one or more other elements, components, and/or assemblies, such as a pad or cushion, a pad/cushion assembly, and/or a trim assembly.

With embodiments, like the one depicted in FIG. 1, an adjustment mechanism 108 may be connected to the seat 104, the seat frame 112, a seat assembly carrier, a seat track assembly, and/or another component of the seat assembly 102. The adjustment mechanism 108 may facilitate, initiate, and/or otherwise perform an adjustment of one or more characteristics of the seat 104 and/or the seat assembly 102, such as position, reclining angle, and/or firmness, among others. With embodiments, the adjustment mechanism 108 may be operatively connected to the seat adjuster 110 such that the seat adjuster 110 may be operated and/or controlled via the adjustment mechanism 108. In some examples, the adjustment mechanism 108 may be configured to receive an input force. The input force may be provided by a user 142 actuating a handle, lever, or other component of the adjustment mechanism 108. Additionally and/or alternatively, the adjustment mechanism 108 may be configured as a controller, a machine, or device configured to receive an input from a user 142, such as a handle, a button, and/or a switch configured to provide a corresponding output force and/or signal to the seat adjuster 110, for example.

Figure 2:
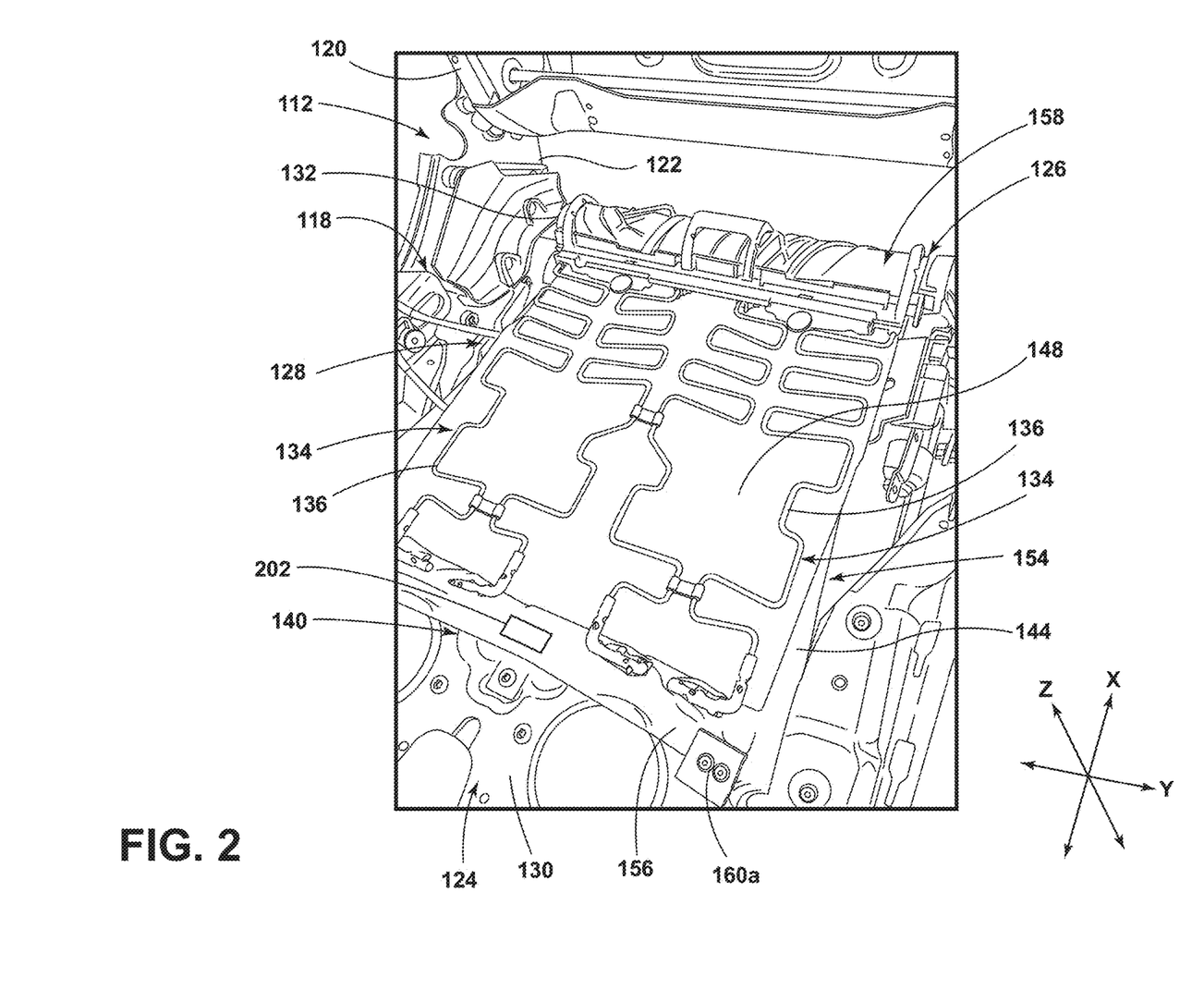
FIG. 2 is a perspective view generally illustrating an intermediate body and a support member of a seat adjuster connected to a seat frame including a suspension portion according to an embodiment of a seat adjuster of the present disclosure.

In embodiments, such as generally shown in FIG. 2, a seat frame 112 may include a bottom portion 118 and a seatback portion 120. The seat bottom 114 may be disposed on and/or connected to the seat frame bottom portion 118. The seatback 116 may be disposed on and/or connected to the seat frame seatback portion 120.

With embodiments, a seat frame 112, a seat frame bottom portion 118, and/or a seat frame seatback portion 120 may be collectively formed as a single, unitary component such that the seat frame 112 is a monolithic structure. Alternatively, the seat frame 112 may be formed by several connected components and/or portions. The bottom portion 118 and the seatback portion 120 of the seat frame 112 may be connected to one another via a connector 122, such as a bracket, a fastener, and/or a hinge.

With embodiments, such as generally depicted in FIG. 2, a seat frame bottom portion 118 may have a generally rectangular shape, or any other appropriate shape. The bottom portion 118 may have a first end 124 and a second end 126, and/or may define an opening 128 (see, also, FIGS. 6A-7B). The opening 128 may facilitate deformation of at least portions of the seat bottom 114 that may occur when a force is applied thereto, such as when a user 142 sits on the seat bottom 114. With some embodiments, the opening 128 may be disposed between the first end 124 and the second end 126 of the bottom portion 118. Additionally and/or alternatively, the opening 128 may be disposed in the seat frame bottom portion 118 offset toward (e.g., closer to) the second end 126.

In embodiments, the seat frame bottom portion 118 may include a plurality of sections and/or components connected together to form and/or define the opening 128. The bottom portion 118 may include a seat pan 130 and/or a support body 132, at least in some embodiments. The seat pan 130 may be disposed at and/or proximate the first end 124. The first end 124 of the bottom portion 118 may also be defined and/or formed, at least in part, by the seat pan 130. While the ends 124, 126 are generally illustrated with respect to an X-direction (e.g., a longitudinal configuration), the ends 124, 126 may be disposed relative to a Y-direction (e.g., a lateral configuration), and/or a direction oblique to an X-direction and/or Y-direction. The support body 132 may be disposed at and/or proximate the second end 126 of the bottom portion 118. The second end 126 of the bottom portion 118 may also be defined and/or formed by the support body 132. The support body 132 may include one or more of a variety of configurations, such as a member, a beam, a bar, a rod, a tube, and/or an extension of the seat frame 112. The support body 132 may, for example, include a tube that may extend substantially in a Y-direction.

In embodiments, the seatback portion 120 of the seat frame 112 may be configured and/or structured similarly to the bottom portion 118 of the seat frame 112. The seatback portion 120 may be connected to the second end 126 of the seat frame bottom portion 118, such as illustrated in the examples of FIGS. 2, 3, 5, 6A, and 6B.

With embodiments, the seat 104, the seat frame 112, the seat bottom 114, and/or the seatback 116 may include one or more suspension portions 134. The suspension portion 134 may be deformable to compensate for an applied force, such as the weight of a user 142 sitting on the seat bottom 114. In embodiments, like the one shown in FIG. 2, the suspension portion 134 may, for example and without limitation, be structured as a wire suspension mat that may include one or more deformable wires 136.

With embodiments, the suspension portion 134 may be connected to the seat frame 112, the bottom portion 118 of the seat frame 112, the seat bottom 114, and/or another portion of the seat assembly 102. In some examples, the suspension portion 134 may be connected directly and/or indirectly to the first end 124 of the seat frame bottom portion 118 (e.g., the seat pan 130) and/or the second end 126 of the seat frame bottom portion 118 (e.g., the support body 132) via a connector, such as a hook, a fastener, a clip, adhesive, screws, bolts, and/or other similar structure.

Figure 5:
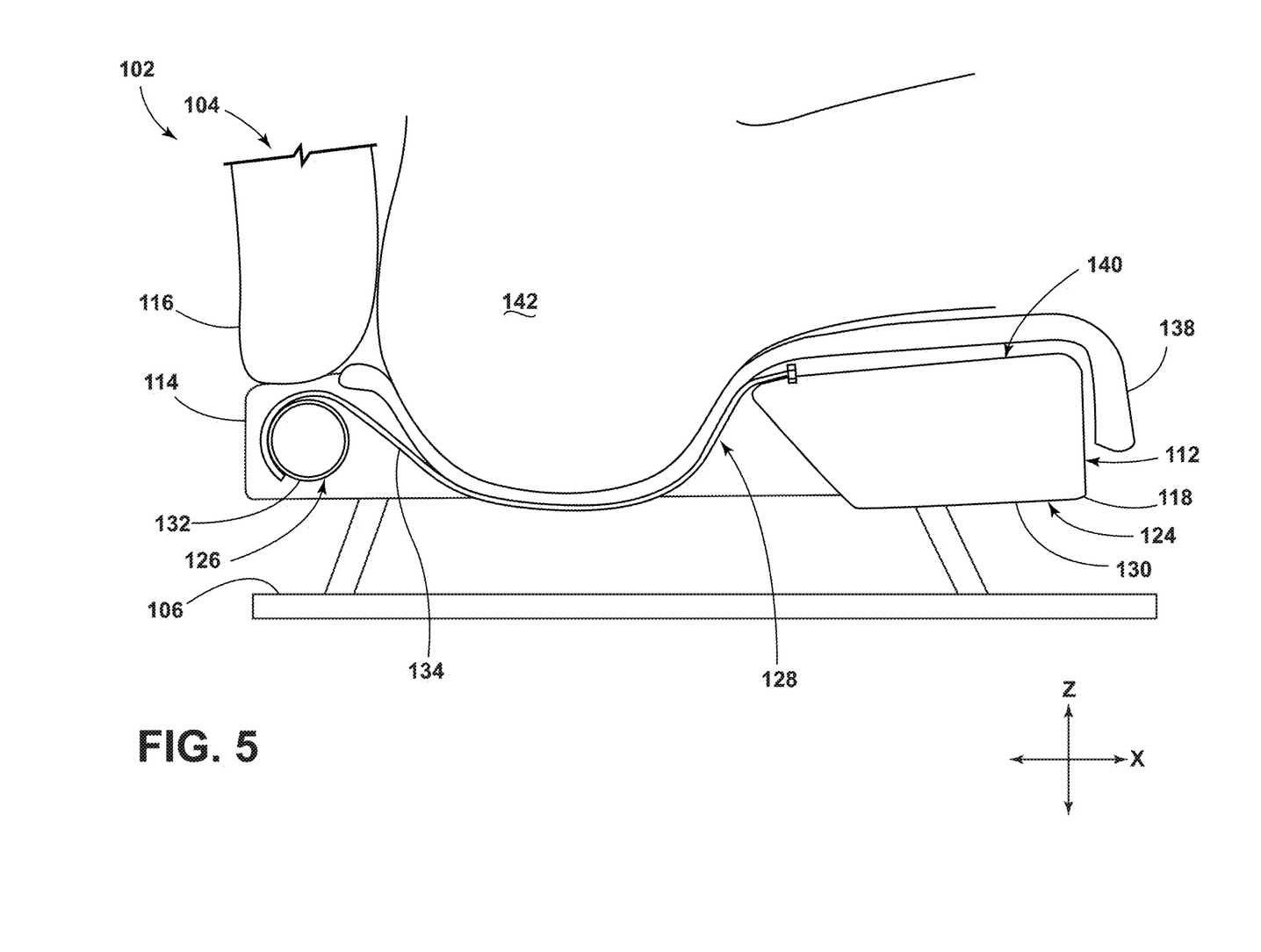
FIG. 5 is a cross-sectional side view of a seat assembly including a suspension portion unsupported by a seat adjuster.
Figure 6A:
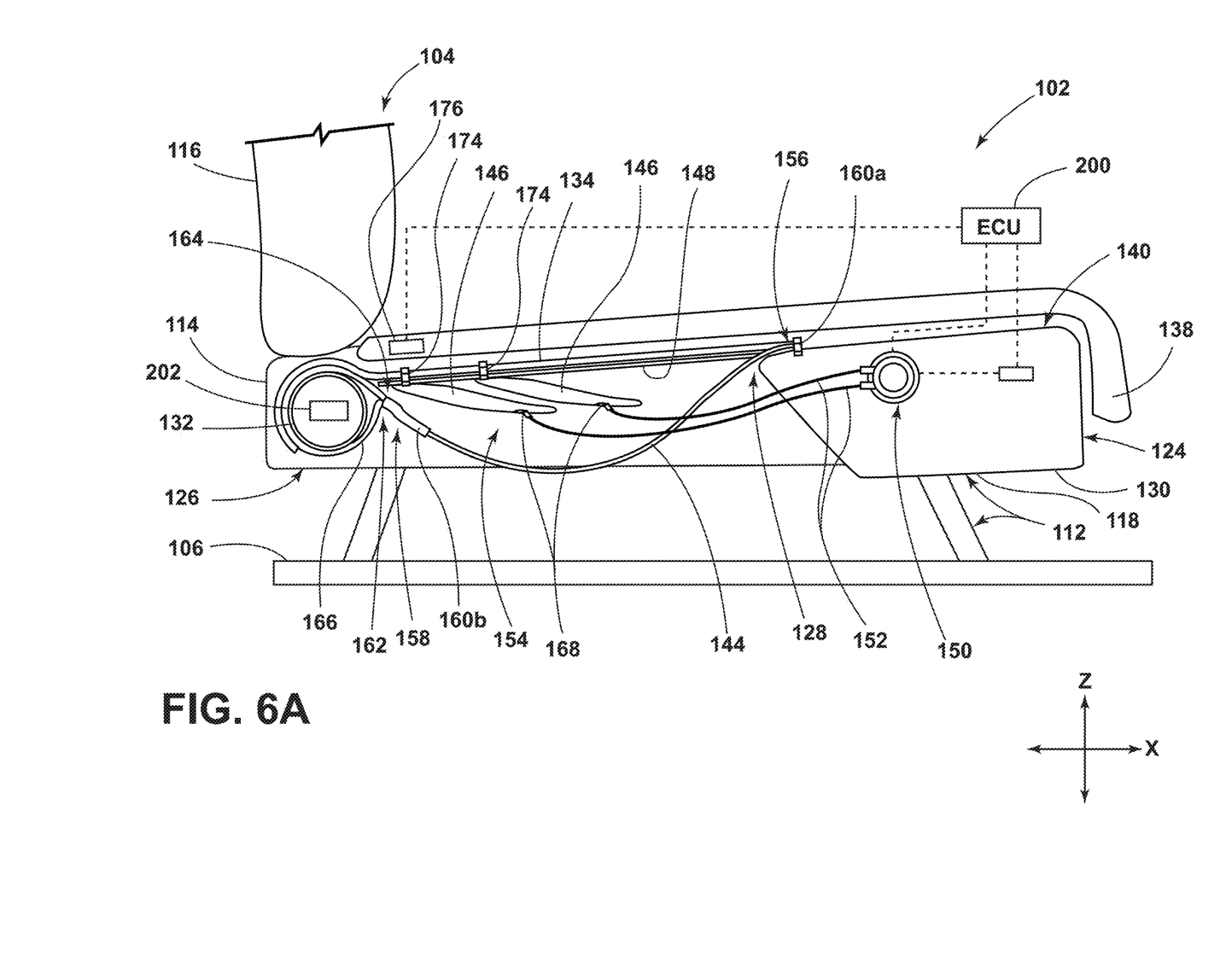
FIG. 6A is a cross-sectional side view of an embodiment of seat assembly including a seat adjuster with uninflated bladders according to teachings of the present disclosure.
Figure 6B:
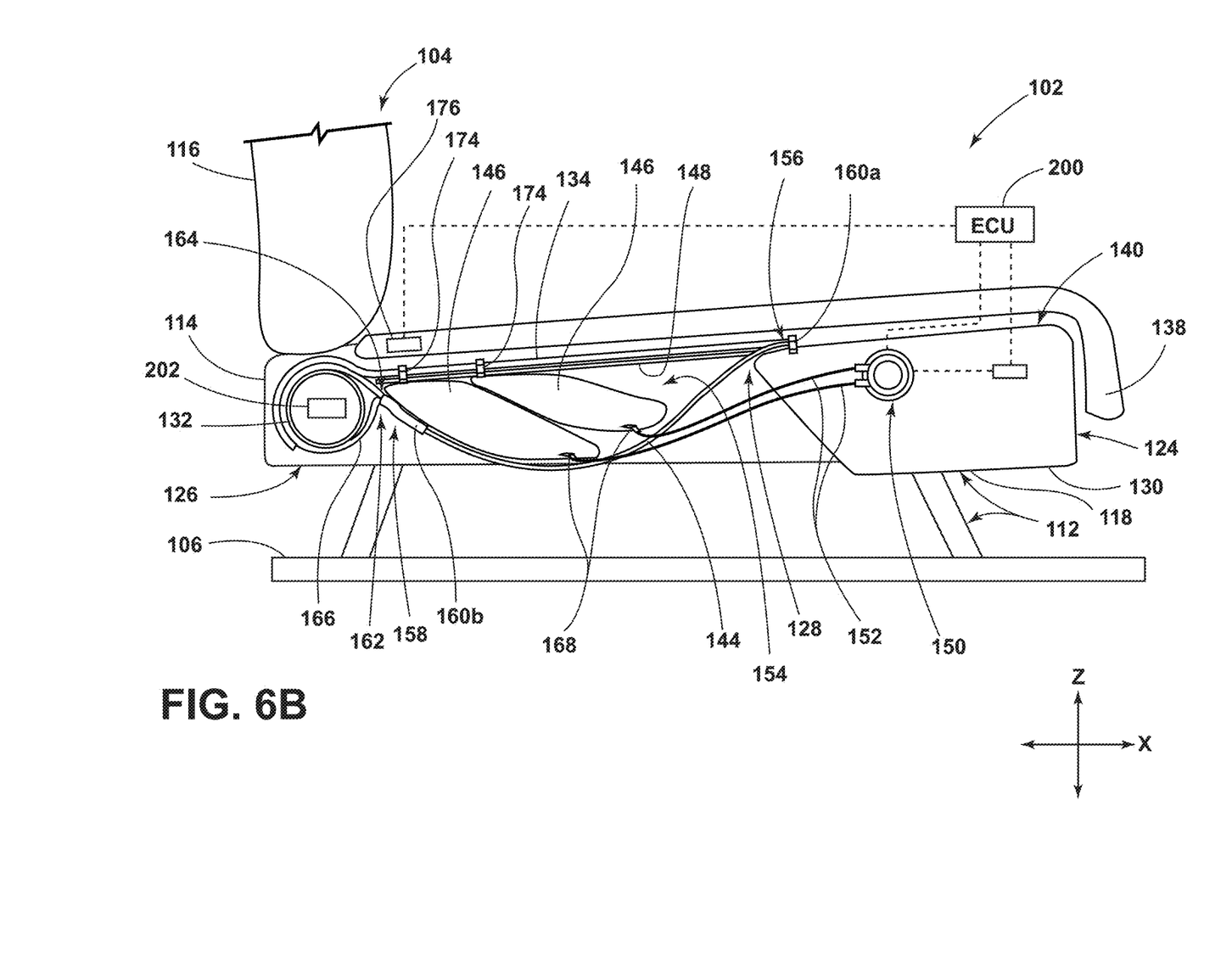
FIG. 6B is a cross-sectional side view of an embodiment of seat assembly including a seat adjuster with inflated bladders according to teachings of the present disclosure.

In embodiments, as generally illustrated in FIGS. 5, 6A, and 6B, a suspension portion 134 may be disposed between the bottom portion 118 of the seat frame 112 and at least a portion of the seat bottom 114, such as a seat cushion 138 of the seat bottom 114. The suspension portion 134 may be disposed at least partially on and/or connected to an upper surface 140 of the seat frame bottom portion 118, which may face away from the vehicle floor 106 (e.g., in a Z-direction). The suspension portion 134 also extend partially or completely across the opening 128. In some configurations, opposite ends of the suspension portion 134 may be connected to structures (e.g., sections of the seat frame bottom portion 118) that are disposed on opposite sides of the opening 128 such that the suspension portion 134 is suspended over, within, and/or below the opening 128. Additionally, one or more suspension portions 134 may be disposed on and/or connected to the seatback portion 120 of the seat frame 112 in a similar manner to the seat frame bottom portion 118.

With embodiments, during operation, a force may be applied to the seat bottom 114 and/or the suspension portion 134, such as by a user 142 sitting on the seat 104. Due to the force, at least a portion of the seat bottom 114, such as the seat cushion 138, and/or the suspension portion 134 may be displaced, deformed, and/or compressed. In some embodiments, the suspension portion 134 may deform such that the suspension portion 134 and/or the seat cushion 138 at least partially extend into and/or through the opening 128 of the seat frame bottom portion 118. In this manner, the opening 128, the suspension portion 134, and the seat cushion 138 provide increased comfort for the user 142 sitting on the seat bottom 114 of the seat 104. However, as generally illustrated in FIG. 5, the seat bottom 114 and suspension portion 134 alone may be insufficient to adequately and/or comfortably support a user 142 sitting in the seat 104.

In embodiments, a seat assembly 102 may include the seat adjuster 110 to selectively provide support to the user 142 (e.g., proximate an opening 128), such as generally depicted in FIGS. 6A and 6B. The seat adjuster 110 may include a support member 144, one or more bladders 146, an intermediate body 148, a fluid supply 150, and/or one or more fluid supply lines 152.

In embodiments, a support member 144 may be configured to form a pocket 154 to at least partially receive and retain one or more bladders 146. The support member 144 may be configured and/or structured as a flexible body that may be resistant to stretching (e.g., may not be materially elastic or resilient), such as a fabric, a membrane, a layer, and/or a sheet. The support member 144 may include and/or may be formed of one or materials, such as plastic, rubber, cotton, nylon, and/or other materials/fabrics. The support member 144 may, for example, include one or more woven ripstop fabrics, which may provide a good strength-to-weight ratio as well as improved tear/rip resistance (e.g., via reinforcement fibers interwoven with the base fibers).

With embodiments, the support member 144 may be connected to the seat frame 112, and/or one or more other components of the seat assembly 102 or vehicle 100. In some embodiments, like the ones shown in FIGS. 2, 3, 6A, and 6B, the support member 144 may be disposed at least partially on and/or connected to the upper surface 140 of the bottom portion 118 of the seat frame 112. Opposite ends of the support member 144 may be connected to structures (e.g., portions of the seat frame bottom portion 118) that are disposed on opposite sides of the opening 128 such that the support member 144 extends partially and/or completely across the opening 128.

Figure 3:
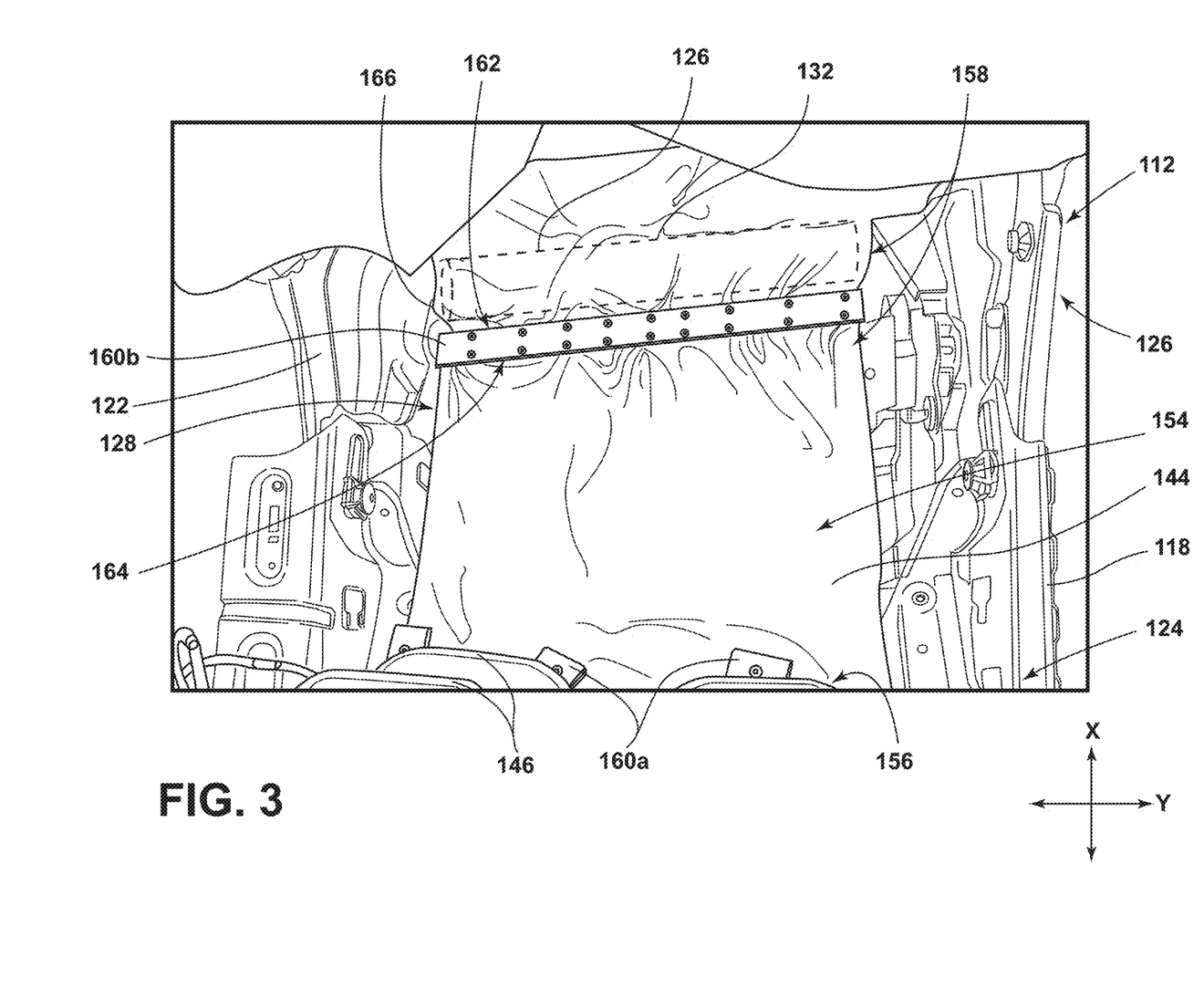
FIG. 3 is a perspective view generally illustrating a support member of a seat adjuster connected to a seat frame of a seat assembly according to an embodiment of a seat adjuster of the present disclosure.

In embodiments, such as generally depicted in FIGS. 2, 3, 6A, and/or 6B, the support member 144 may have a first end 156 and a second end 158. The first end 156 of the support member 144 may be connected directly and/or indirectly to the first end 124 of the seat frame bottom portion 118 and/or the seat pan 130 via one or more connector 160a, such as fasteners, clips, rivets, adhesive, a weld, screws, bolts, and/or other similar structures.

With embodiments, the second end 158 of the support member 144 may be disposed opposite the first end 156 (e.g., in a longitudinal/X-direction), and may be connected directly and/or indirectly to the second end 126 of the seat frame bottom portion 118 via a connector 160b. In embodiments, like those depicted in FIGS. 3, 6A, and 6B, the second end 158 of the support member 144 may loop around a portion of the second end 126 of the seat frame bottom portion 118, such as the support body 132, which may connect the second end 158 of the support member 144 to the seat frame 112. A region 162 of the second end 158 may be connected to a joining region 164 of the support member 144 such that the second end 158 includes and/or forms a loop portion 166 that wraps around a portion of the seat frame bottom portion 118 (e.g., the support body 132). The region 162 of the second end 158 of the support member 144 may be connected to the joining region 164 via one or more connectors 160b, such as fasteners, clips, welds, adhesives, rivets, screws, bolts, and/or other similar structures.

In embodiments, a support member 144 may be disposed at least partially below the suspension portion 134. In embodiments, the support member 144 may hang under little or no tension (e.g., slack) from the bottom portion 118 of the seat frame 112 such that the support member 144 is suspended at least partially below the opening 128 in a hammock-like manner, for example. As such, the support member 144 may form and/or define a pocket 154 below the opening 128, such as generally illustrated in FIGS. 1, 2, 3, 6A, 6B, 7A, and 7B. The pocket 154 may be defined as the space between the first end 156 and the second end 158 of the support member 144 that is disposed between the support member 144 and the suspension portion 134, which is generally shown in FIGS. 6A and 6B.

In embodiments, the intermediate body 148 may be configured and/or structured as a flexible body which may or may not flex and/or stretch when subjected to a force, such as a fabric, a membrane, a sheet, and/or a layer of material, like carpet for example. The intermediate body 148 may be disposed between the suspension portion 134 and the bladders 146. In at least some examples, the intermediate body 148 may form a type of barrier between the suspension portion 134 and the bladders 146 to prevent direct contact therebetween. Providing the intermediate body 148 between the suspension portion 134 and the bladders 146 may help distribute and/or spread out forces more evenly across the bladders 146 to prevent regions of elevated/excessive pressure, which could potentially cause (i) failure of one or more of the bladders 146 (e.g., a rupture, hole, or leak), (ii) uneven support of the suspension portion 134, the seat bottom 114, and/or the user 142, and/or (iii) a shortened operational/service life of the bladders 146 and, thus, the seat adjuster 110.

With embodiments, like those shown in FIGS. 6A, 6B, 7A, and 7B, the intermediate body 148 may be configured and/or structured to be displaced in conjunction with the suspension portion 134. The intermediate body 148 may be connected to the suspension portion 134, the bottom portion 118 of the seat frame 112, and/or the seat bottom 114. In embodiments, the intermediate body 148 may be disposed at least partially between the bottom portion 118 of the seat frame 112 and the suspension portion 134. The intermediate body 148 may, additionally and/or alternatively, be disposed on the first end 156 and the second end 158 of the support member 144 such that the support member 144 is disposed between the intermediate body 148 and the bottom portion 118 of the seat frame 112. The intermediate body 148 may extend partially or completely across the opening 128 (e.g., in an X-direction and/or a transverse/Y-direction). In some configurations, opposite ends of the intermediate body 148 may be connected to structures disposed on opposite sides of the opening 128 such that the intermediate body 148 may be suspended over, within, and/or below the opening 128. Additionally and/or alternatively, the intermediate body 148 may extend, partially or completely, between the first end 156 and the second end 158 of the support member 144 and may be at least partially disposed within the pocket 154.

With embodiments, a seat adjuster 110 may include one or more bladders 146. The bladders 146 may be any appropriate type of body or structure in which a fluid (e.g., a liquid or gas) can be retained, and may be composed of one or more of a variety of different materials, such as plastic and/or rubber. In embodiments, such as generally illustrated in FIGS. 6A, 6B, 7A, and 7B, the bladders 146 may be inflatable bladders configured to receive, retain, and/or release a fluid, such as air. The bladders 146 may each define a volume which may vary based on the amount, pressure, and/or volume of fluid retained in the bladder 146. As such, the volume of the bladders 146 may be adjusted by increasing and/or decreasing the volume of fluid retained therein. The volume of the fluid retained in a bladder 146 may be increased/decreased in one or more a variety of different ways, such as pumping more fluid into and/or out of the bladder 146, heating and/or cooling the fluid retained in the bladder 146, and/or initiating a chemical reaction within the bladder 146. In some embodiments, at least some of the bladders 146 may include one or more fluid ports/nozzles 168 through which fluid may flow into and/or out of the bladders 146. The fluid ports 168 may be selectively opened to allow for the through passage of fluid, and closed to prevent and/or block the through passage of fluid and seal the bladders 146. In some circumstances, a minimum, non-zero/positive pressure may be maintained in the one or more bladders 146, such as to provide a minimum amount of support.

Figure 4:
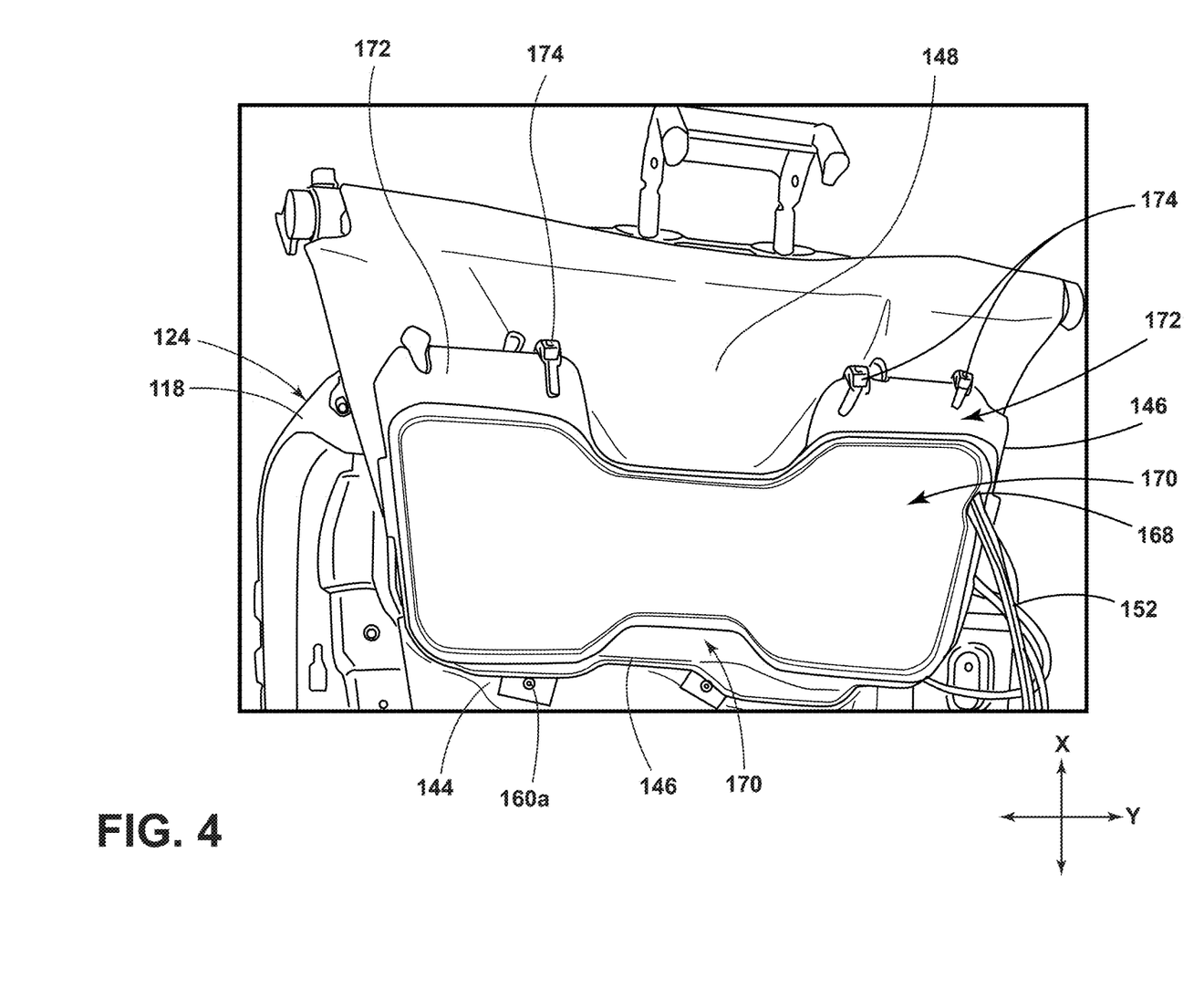
FIG. 4 is a perspective view generally illustrating portions of an embodiment of a seat adjuster including multiple bladders connected to an intermediate body according to teachings of the present disclosure.

In examples, such as the one depicted in FIG. 4, the bladders 146 may include a main portion 170 and a flange portion 172. In some embodiments, the main portion 170 and the flange portion 172 may be integrally provided as a single component and/or may be structured separately from one another and then connected together. The main portion 170 may configured to receive and retain the fluid. The flange portion 172 may be connected to and protrude away from the main portion 170, such as in an X-direction. The flange portion 172 may be thicker, more rigid, and/or of a sturdier construction than the main portion 170.

With embodiments, the bladders 146 may be connected to the intermediate body 148 and/or may be disposed at least partially within the pocket 154. One or more of the bladders 146 may be connected (e.g., fixed, attached, etc.) to the intermediate body 148 by one or more connectors 174. The connectors 174 may include a mechanical connector, such as a fastener, a clip, a zip tie, adhesive, rivets, screws, nut and bolt, and/or other similar structures. In embodiments, a connector 174 may be configured to simultaneously engage one or more of the bladders 146, the intermediate body 148, and the suspension portion 134 to connect all three together. With some embodiments, the one or more bladders 146 may, for example, be attached to the intermediate body 148 and/or may not be attached/fixed to the support member 144.

In some embodiments, the bladders 146 may be connected to the intermediate body 148 via the flange portion 172. If a flange portion 172 has a sturdier construction, connecting the bladders 146 via the flange portion 172 may provide a more stable and reliable connection. The main portion 170 of the bladders 146, in some embodiments, may hang from the intermediate body 148 such that the bladders 146 are at least partially suspended in the pocket 154 above the support member 144 when the suspension portion 134 is in an undeformed position (seem e.g., FIG. 6A). In some embodiments, the connector 174 may be a zip tie, which may pass through a flange portion 172 of one or more of the bladders 146, through the intermediate body 148, and around a portion of the suspension portion 134 (e.g., around one or more of the wires 136 of a wire suspension mat).

With embodiments, like those depicted in FIGS. 6A, 6B, 7A, and 7B, a seat adjuster 110 may also include the fluid supply 150, such as a fluid supply mechanism/device, a fluid pump, and/or a compressed air device, for example. The fluid supply 150 may be operatively connected to and in fluid communication with the bladders 146 and may be configured to provide/facilitate a flow of fluid (e.g., liquid or gas) into and/or out of the bladders 146. In some examples, one or more fluid lines 152 may be operatively connected to the fluid supply 150 at one end and to the one or more of the bladders 146, via the fluid port 168 for example, at the other end.

With examples, a seat adjuster 110 may include an ECU 200 and/or controller configured to control the fluid supply 150. In embodiments, the ECU 200 may be operatively connected to and/or incorporated with the fluid supply 150 and/or the adjustment mechanism 108. The seat adjuster 110 may include one or more sensors 176 that may be configured to sense the presence of a force on the suspension portion 134, the amount of fluid within one or more of the bladders 146, the amount of pressure being exerted on the bladders 146, and/or the pressure inside the bladders 146. The sensor(s) 176 may be operatively and/or communicatively connected to the fluid supply 150 and/or the ECU 200 to facilitate operation of the seat adjuster 110 and/or inflation levels of the bladders 146.

In embodiments, as generally shown in FIG. 6A, when no force is applied to the seat bottom 114 and/or suspension portion 134, the bladders 146 may be partially or completely deflated. When a force is then applied to the seat bottom 114 and/or the suspension portion 134, the bladders 146 may be inflated by the fluid supply 150 automatically by the ECU 200 and/or manually by the user 142 actuating the adjustment mechanism 108. When a force is removed from the seat bottom 114 and/or suspension portion 134, the bladders 146 may be partially or completely inflated and may retain the volume of fluid that was set during a previous use as illustrated in FIG. 6B. Additionally or alternatively, the ECU 200 may automatically deflate the bladders 146 upon the removal of force, which may be sensed via one or more sensors 176.

Figure 7A:
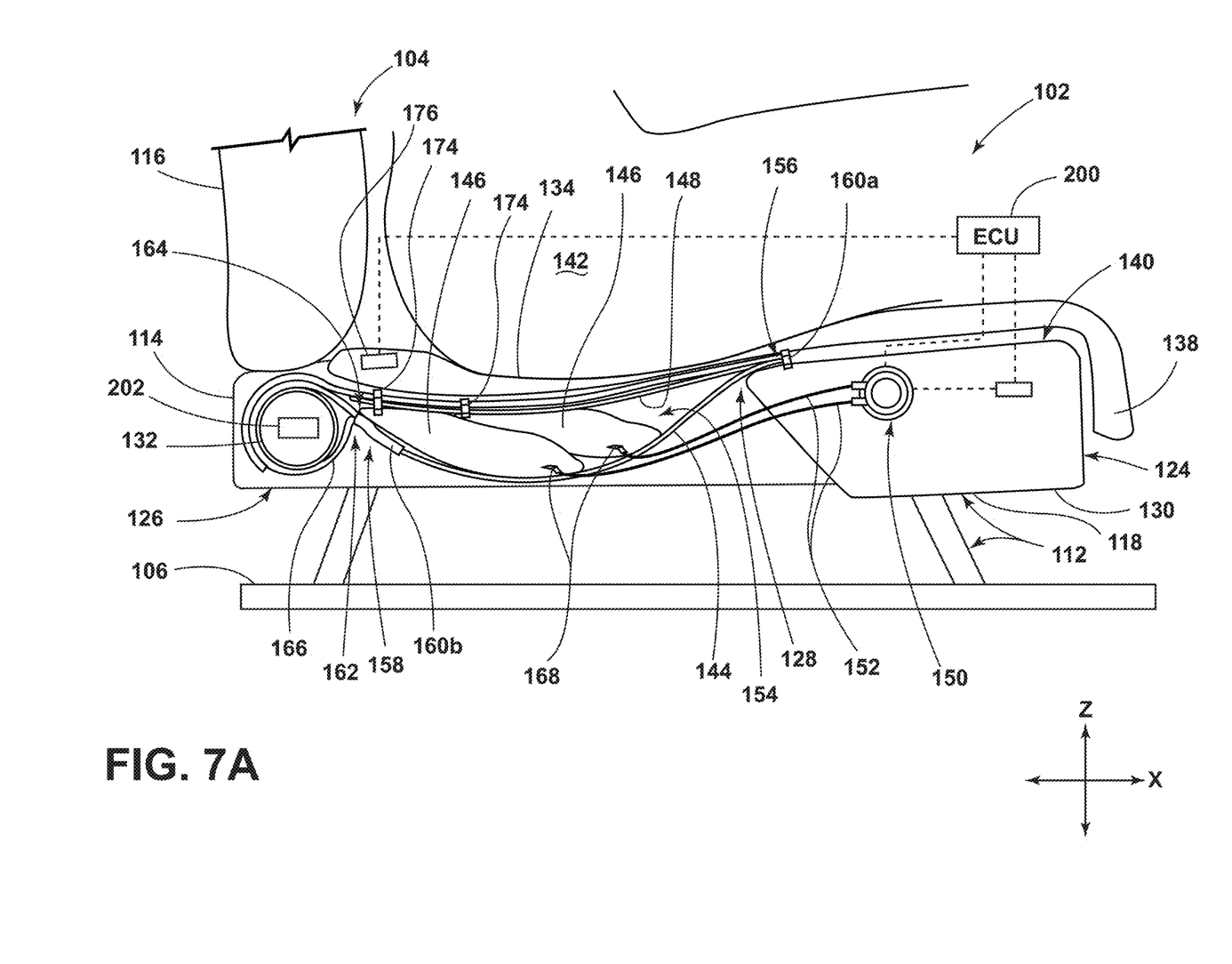
FIG. 7A is a cross-sectional side view of an embodiment of a seat assembly including a seat adjuster providing a first amount of support to a user sitting on the seat assembly according to teachings of the present disclosure.

In examples, one or more bladders 146 of a seat adjuster 110 may provide an adjustable amount of support to the suspension portion 134, the seat bottom 114, and, ultimately, the user 142 sitting in the seat 104 by restricting, reducing, and/or preventing deformation of the suspension portion 134. As generally illustrated in FIG. 7A, when a force is applied to the seat bottom 114 and/or the suspension portion 134, the suspension portion 134 may deform and protrude, at least to some degree, into and/or through the opening 128 of the bottom portion 118 of the seat frame 112. This in turn, may deform and/or displace the intermediate body 148 downward toward the support member 144 and press the bladders 146 against the support member 144. The support member 144 may be configured to conform, to some degree, to the shape of the bladders 146, such as to facilitate an even distribution of pressure among the bladders 146 and the suspension portion 134.

Additionally or alternatively, as the support member 144 may be resistant to deformation and stretching, pressing the bladders 146 against the support member 144 may not result in significant movement of the support member 144 in a vertical/Z-direction, which may result in the support member 144 restricting and/or substantially preventing the one or more bladder 146, the intermediate body 148, the suspension portion 134 and/or the seat bottom 114 from being further displaced and/or deformed toward the vehicle floor 106 (e.g., in a Z-direction). For example and without limitation, the support member 144 may effectively act like a rigid member. While further displacement and/or deformation of the suspension portion 134 and/or the intermediate body 148 may otherwise be possible, such displacement/deformation may be restricted and/or prevented by the contact between the bladders 146 and the support member 144. In this manner, for example, the bladders 146 may support the suspension portion 134, the seat bottom 114, and/or the user 142 sitting in the seat 104.

With embodiments, the amount of support provided by the bladders 146 (e.g., the extent to which deformation/displacement of the suspension portion 134 may be restricted) may be varied by adjusting the volume of one or more of the bladders 146, such as via the fluid supply 150.

In some embodiments, like the one depicted in FIG. 7A, the one or more bladders 146 may be partially inflated and retain a first volume of fluid to provide a first amount (e.g., an intermediate amount) of support to the suspension portion 134, the seat bottom 114, and/or the user 142.

Figure 7B:
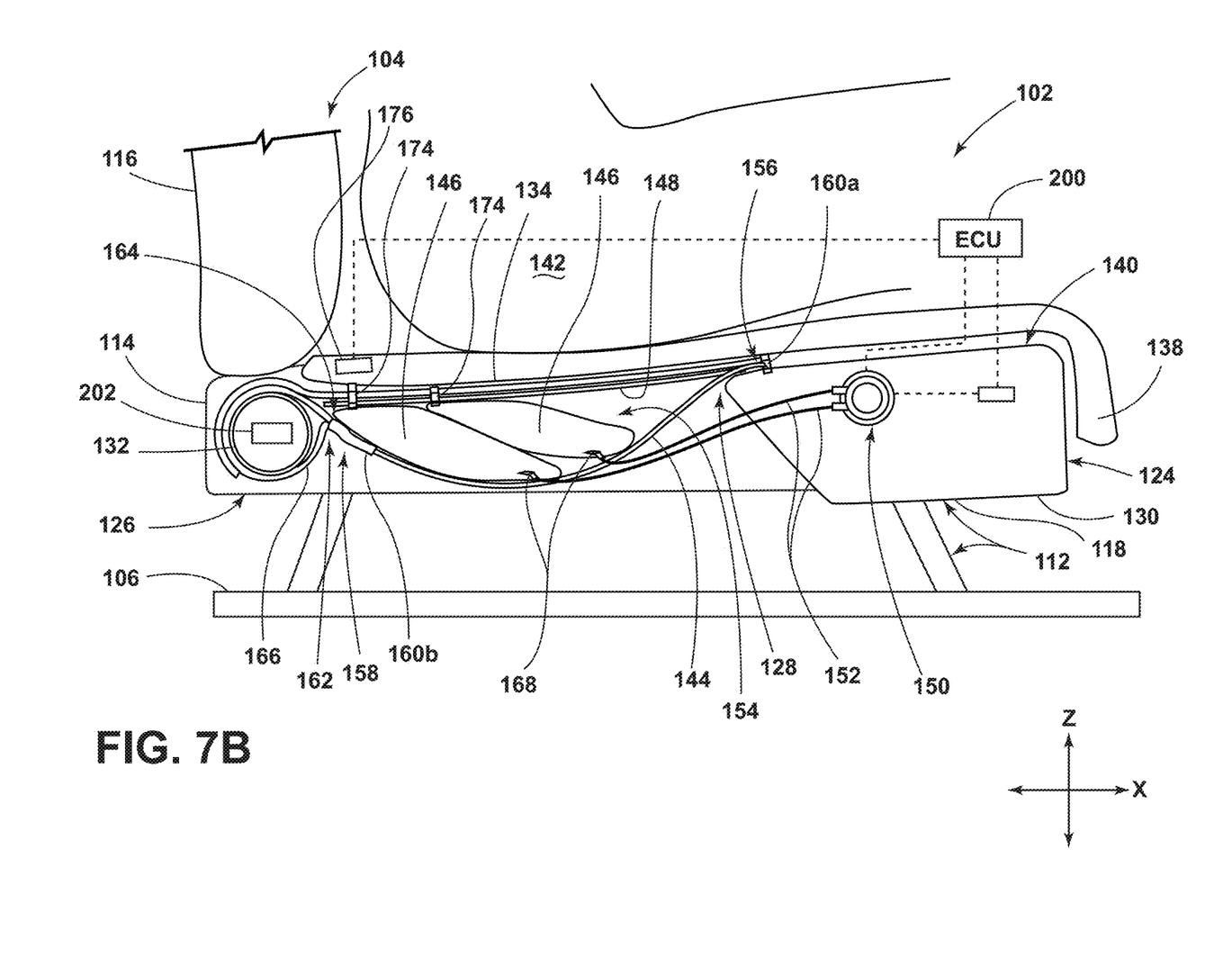
FIG. 7B is a cross-sectional side view of an embodiment of a seat assembly including a seat adjuster providing a second amount of support to a user sitting on the seat assembly according to teachings of the present disclosure.

In embodiments, like the one depicted in FIG. 7B, the one or more bladders 146 may be inflated to a second volume of fluid to provide a second amount of support to the suspension portion 134, the seat bottom 114, and the user 142. When inflated to the second volume, the bladders 146 may be in contact with the intermediate body 148 and the support member 144. With some examples, the bladders 146 may retain the second volume of fluid when completely inflated, which may provide a maximum amount of support. When a force is applied to the suspension portion 134, for example by a user 142 sitting in the seat 104, displacement and/or deformation of the suspension portion 134 and/or the intermediate body 148 may be restricted or substantially prevented as a result of the support provided by fully inflated bladders 146.

In embodiments, one or more bladders 146 may be disposed in a grid or other pattern and/or may be adjusted (e.g., individually), such as via the ECU 200, to provide different levels of support in different areas and/or directions (e.g., a X-direction, a Y-direction, etc.).

With embodiments, a method of operating the seat assembly 102 may include applying a force to a suspension portion 134, inflating one or more bladders 146 to one of a plurality of inflation levels corresponding to a plurality of levels of support, and/or limiting deformation of the suspension portion 134 (e.g., and a corresponding area of support for the user 142) via the one or more bladders 146 and the support member 144.

With embodiments, such as generally illustrated in FIGS. 6A, 6B, 7A, and 7B, a seat assembly 102 may include an actuator 202. The actuator 202 may be configured to adjust the support member 144, which may include adjusting the length and/or the tension of the support member. The actuator 202 may include one or more of a variety of shapes, sizes, configurations, and/or materials. For example and without limitation, the actuator 202 may include one or more electric motors or linear actuators that may roll/shift the support member 144 to adjust the length of the support member 144, such as via the ECU 200 that may be configured to control operation of the actuator 202. Additionally or alternatively, the actuator 202 may include one or more levers or cams that may be configured to move (e.g., rotate) to adjust the support member 144.

In embodiments, adjusting the support member 144 may adjust the support provided by the support member 144 (e.g., to the suspension portion 134 and/or the user 142). For example and without limitation, if the effective length of the support member 144 is shorter (e.g., after being shortened/rolled by the actuator 202), the support member 144 may provide increased support and/or limit movement of the suspension portion 134/user 142 to a greater extent. A seat assembly 102 may, for example and without limitation, include an actuator 202 instead of or in addition to one or more bladders 146. The actuator 202 may be controlled, at least in part, via the adjustment mechanism 108. Portions of the actuator 202 may, for example and without limitation, be connected at or about a first end 156 of the support member 144 and/or at or about a second end 158 of the support member 144 (e.g., front/rear, left/right, etc.).

Figure 8A:
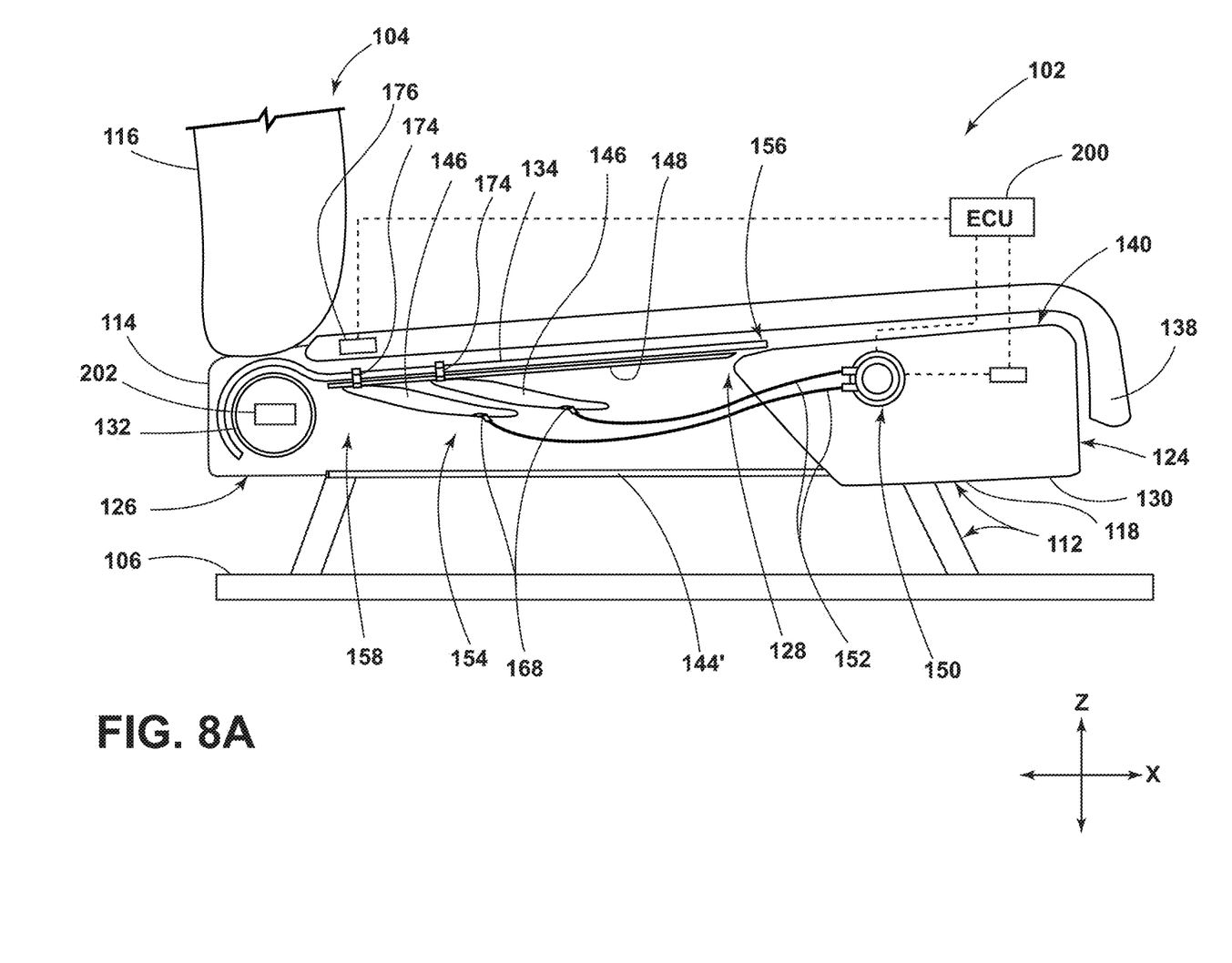
FIG. 8A is a cross-sectional side view of an embodiment of seat assembly including a seat adjuster with uninflated bladders according to teachings of the present disclosure.
Figure 8B:
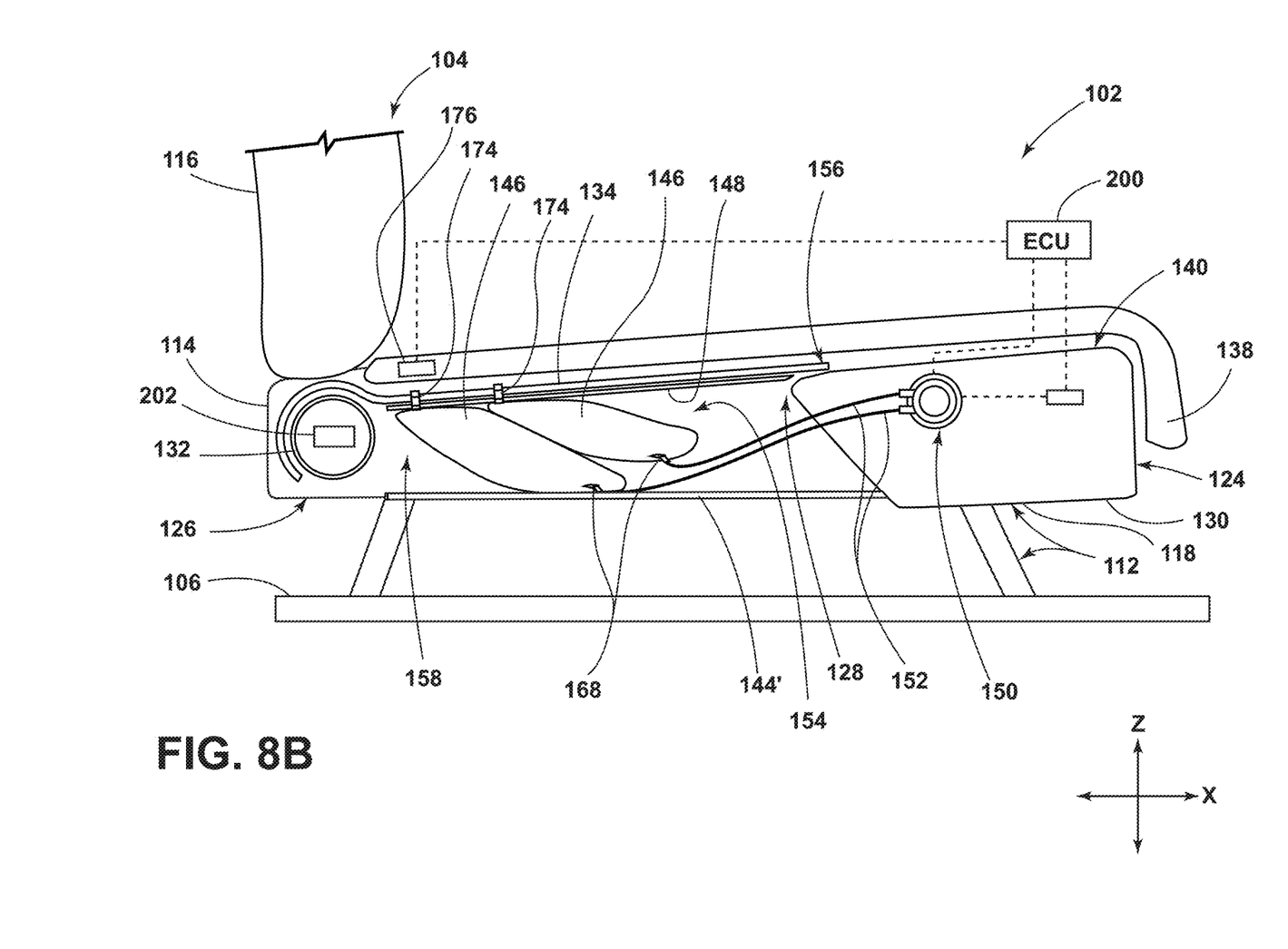
FIG. 8B is a cross-sectional side view of an embodiment of seat assembly including a seat adjuster with inflated bladders according to teachings of the present disclosure.

With embodiments, such as generally illustrated in FIGS. 8A and 8B, a seat assembly 102 may include a support member 144' that may be substantially rigid. For example and without limitation, the support member 144' may be configured as an ECU tray (e.g., to which ECU 200 may be connected/fixed) and/or may include a substantially rigid plastic and/or metal. For example and without limitation, the support member 144' may be rigid enough that it does not materially deform when a user sits on the seat 104, regardless of movement of the suspension portion 134 and the configuration of the one or more bladders 146. The support member 144' may, for example, be substantially planar and/or horizontal. The support member 144' may be disposed partially or entirely below the suspension portion 134 and/or the one or more bladders 146, and/or below a level of the support body 132. The support member 144' may be connected, at least indirectly, to the seat frame 112. The support member 144' may, for example, be connected to the seat frame 112 independent of the support body 132.

With embodiments, in an uninflated state, the one or more bladders 146 may not contact the support member 144' (see, e.g., FIG. 8A). In an inflated state, one or more bladders 146 may contact the support member 144', which may provide support to and/or restrict movement of the suspension portion 134 and/or the user 142 (see, e.g., FIG. 8B). For example, the support member 144' may be configured not to materially move or deform when a user 142 sits on the seat 104 and/or when the one or more bladders 146 are inflated such that inflation of the one or more bladders 146 may support and/or cause movement (e.g., upward movement) of the suspension portion 134 and/or the user 142.

In examples, an ECU (e.g., ECU 200) may include an electronic controller and/or include an electronic processor, such as a programmable microprocessor and/or microcontroller. In embodiments, an ECU may include, for example, an application specific integrated circuit (ASIC). An ECU may include a central processing unit (CPU), a memory (e.g., a non-transitory computer-readable storage medium), and/or an input/output (I/O) interface. An ECU may be configured to perform various functions, including those described in greater detail herein, with appropriate programming instructions and/or code embodied in software, hardware, and/or other medium. In embodiments, an ECU may include a plurality of controllers. In embodiments, an ECU may be connected to a display, such as a touchscreen display Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A seat assembly, comprising:
   a seat adjuster, including:
      a support member having a first end and a second end; and
      a fluid bladder;
   a seat frame, including:
      a seat bottom portion;
      a seatback portion; and
      a suspension portion;
   wherein the first end and the second end are connected to the seat frame such that the support member is disposed at least partially below the suspension portion of the seat frame;
   the fluid bladder is disposed between the support member and the suspension portion;
   the fluid bladder provides support to said suspension portion;
   a change or adjustment of a volume of the fluid bladder changes or adjusts the support provided to the suspension portion;
   the support member comprises a flexible body that is resistant to stretching;
   the seat bottom portion defines an opening;
   the suspension portion is connected to the seat frame and extends across the opening;
   the seat adjuster includes a connector connecting the fluid bladder and the suspension portion; and
   the fluid bladder hangs from the suspension portion such that the fluid bladder is at least partially suspended in a pocket provided by the support member.

2. The seat assembly according to claim 1, including an intermediate body configured to facilitate support of said suspension portion via the fluid bladder;
   wherein the fluid bladder is disposed at least partially between the support member and the intermediate body.

3. The seat assembly according to claim 2, wherein:
   the fluid bladder and the intermediate body are connected via a connector;
   the connector is engaged with the suspension portion; and
   the fluid bladder and the intermediate body are connected to the suspension portion via the connector.

4. The seat assembly according to claim 1, including an intermediate body configured to facilitate support of said suspension portion via the fluid bladder;
   wherein the fluid bladder is disposed at least partially between the support member and the intermediate body; and
   a flange portion of the fluid bladder is connected to the intermediate body.

5. The seat assembly according to claim 4, wherein the intermediate body extends substantially across the pocket between the first end and the second end of the support member.

6. The seat assembly according to claim 1, wherein the support member is configured as a woven rip-stop fabric including a plurality of base fibers and a plurality of reinforcement fibers interwoven with the plurality of base fibers.

7. The seat assembly according to claim 1, wherein the fluid bladder and the support member are configured to adjustably limit deformation of the suspension portion.

8. The seat assembly according to claim 1, wherein:
the first end and the second end of the support member are connected to the seat frame on opposite sides of the opening.

9. The seat assembly according to claim 8, wherein at least one of the first end and the second end of the support member extend up through the opening and are connected to an upper surface of the seat frame.

10. The seat assembly according to claim 8, wherein:
the suspension portion includes a wire suspension mat; and
the wire suspension mat is deformable such that a portion of the wire suspension mat protrudes into the pocket, provided by the support member, when a force is applied to the wire suspension mat.

11. The seat assembly according to claim 8, wherein:
the fluid bladder is disposed below the suspension portion and above the support member;
the seat frame includes a support body disposed at or about a rear of the seat frame, and a seat pan disposed at or about a front of the seat frame;
the suspension portion is connected to the support body; and
the support member is looped completely around the support body.

12. The seat assembly according to claim 1, wherein:
the first end and the second end of the support member are connected to the seat bottom portion on opposite sides of the opening;
the seat bottom portion includes a first end and a second end disposed on opposite sides of the opening;
the seatback portion is connected to the second end of the seat bottom portion; and
the opening is disposed offset toward the second end of the seat bottom portion.

13. The seat assembly according to claim 12, wherein:
the seat bottom portion includes a seat pan and a support body;
the seat pan is disposed at the first end of the seat bottom portion;
the support body is disposed proximate the second end of the seat bottom portion;
the first end of the support member is connected to the seat pan; and
the second end of the support member loops around the support body and is connected to a joining region of the support member to form a looped portion that connects the second end of the support member to the second end of the seat bottom portion.

14. A method of operating the seat assembly of claim 1, the method comprising:
applying a force to the suspension portion;
inflating the fluid bladder to one of a plurality of inflation levels corresponding to a plurality of levels of support; and
limiting deformation of the suspension portion via the fluid bladder and the support member.

15. The seat assembly of claim 1, comprising:
an intermediate body configured to facilitate support of said suspension portion via the fluid bladder;
wherein
the fluid bladder is at least partially disposed between the support member and the intermediate body;
the intermediate body is at least partially disposed between the fluid bladder and the suspension portion; and
the connector is connected to the suspension portion to connect the fluid bladder and the intermediate body to the suspension portion.

16. The seat assembly of claim 15, wherein:
the fluid bladder includes a main portion and a flange portion;
the main portion is configured to receive and retain a fluid;
the flange portion has a sturdier construction than the main portion; and
the flange portion is connected to the intermediate body and the suspension portion via the connector.

17. A vehicle comprising the seat assembly of claim 1.

18. The seat assembly of claim 1, comprising a plurality of fluid bladders including the fluid bladder;
wherein the plurality of fluid bladders are disposed in a grid pattern and are individually adjustable via an electronic control unit.

19. The seat assembly of claim 18, wherein, in an uninflated state, at least one of the plurality of fluid bladders is not in contact with the support member.

20. A vehicle comprising the seat assembly of claim 1, wherein:
the seat assembly comprises a plurality of fluid bladders including the fluid bladder;
the plurality of fluid bladders are individually adjustable via an electronic control unit; and
in an uninflated state, at least one of the plurality of fluid bladders is not in contact with the support member.

* * * * *